(12) United States Patent
Masubuchi et al.

(10) Patent No.: US 8,168,728 B2
(45) Date of Patent: May 1, 2012

(54) POLYCARBONATE DIOL WITH EASE OF REACTION STABILIZATION

(75) Inventors: Tetsuo Masubuchi, Tokyo (JP); Eizaburo Ueno, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 198 days.

(21) Appl. No.: 12/742,478

(22) PCT Filed: Nov. 4, 2008

(86) PCT No.: PCT/JP2008/070027
§ 371 (c)(1),
(2), (4) Date: May 12, 2010

(87) PCT Pub. No.: WO2009/063768
PCT Pub. Date: May 22, 2009

(65) Prior Publication Data
US 2010/0292497 A1 Nov. 18, 2010

(30) Foreign Application Priority Data
Nov. 16, 2007 (JP) ................................. 2007-297407

(51) Int. Cl.
C08G 18/44 (2006.01)
C08G 63/06 (2006.01)
C07C 69/675 (2006.01)
(52) U.S. Cl. .................... 525/452; 528/361; 558/265
(58) Field of Classification Search .................... None
See application file for complete search history.

(56) References Cited

U.S. PATENT DOCUMENTS

| 4,855,377 | A | 8/1989 | Yokota et al. |
| 5,436,399 | A | 7/1995 | Koyama et al. |
| 6,706,932 | B1 | 3/2004 | Konishi et al. |
| 7,005,495 | B2 * | 2/2006 | Konishi et al. .................. 528/85 |
| 7,112,693 | B2 | 9/2006 | Tillack et al. |
| 7,179,880 | B2 | 2/2007 | Kawa et al. |
| 2003/0176622 | A1 | 9/2003 | Konishi et al. |
| 2010/0261852 | A1 | 10/2010 | Masubuchi et al. |

FOREIGN PATENT DOCUMENTS

| CN | 1430637 | 7/2003 |
| JP | 5-025264 | 2/1993 |
| JP | 5029648 | 5/1993 |
| JP | 3724561 | 10/2001 |
| JP | 2003-246852 | 9/2003 |
| JP | 2005-508998 | 4/2005 |
| JP | 2006-104253 | 4/2006 |
| JP | 2006-124485 | 5/2006 |
| JP | 2006-176704 | 7/2006 |
| JP | 3874664 | 1/2007 |
| KR | 10-2003-0001564 | 1/2003 |
| WO | 01/34543 | 5/2001 |

OTHER PUBLICATIONS

International Search Report for PCT/JP2008/070027, mailed Jan. 13, 2009.
English-language Abstract of JP 2289616, published May 6, 1993 (corresponding to JP 5029648).
English-language Abstract of JP 2001270938, published Oct. 2, 2001 (corresponding to JP 3724561).
English-language Abstract of WO 01/90213, published Nov. 29, 2001 (corresponding to JP 3874664).
Office Action issued with respect to U.S. Appl. No. 12/742,544 dated Dec. 21, 2011.
Korea Office action that issued with respect to patent family member Korean Patent Application No. 10-2010-7007718, mail date is Oct. 19, 2011.
China Office action that issued with respect to patent family member Chinese Patent Application No. 200880116024.6, mail date is Aug. 3, 2011.

* cited by examiner

*Primary Examiner* — Rebecca Anderson
*Assistant Examiner* — Alicia L Otton
(74) *Attorney, Agent, or Firm* — Greenblum & Bernstein, P.L.C.

(57) ABSTRACT

A polycarbonate diol comprising repeating units represented by the following formula (A) and a terminal hydroxy group. It is characterized in that 60-100 mol % of the repeating units represented by the formula (A) are repeating units represented by the following formula (B) or (C), the amount of the repeating units represented by the formula (B) is 10-50 mol %, excluding 50 mol %, based on the total amount of the repeating units represented by the formula (A), and the polycarbonate diol has a terminal primary OH ratio of 95-98.5%. (A) (In the formula, R represents a $C_{2-12}$ divalent aliphatic or alicyclic hydrocarbon.)

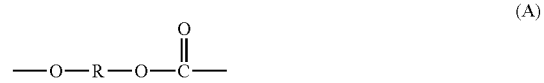

(A)

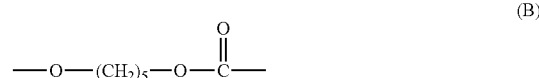

(B)

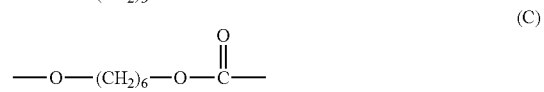

(C)

4 Claims, No Drawings

POLYCARBONATE DIOL WITH EASE OF REACTION STABILIZATION

TECHNICAL FIELD

The present invention relates to a polycarbonate diol suitable as a constituent material of coating materials and further as a raw material for polyurethane, thermoplastic elastomer and the like. Particularly, in the case of using a polycarbonate diol as a raw material for coating materials, the present invention relates to a polycarbonate diol which can provide a coating film exhibiting no feeling of roughness originated from fine gelatinous substances and no feeling of tackiness originated from low-molecular weight substances, and further having well balanced performances including hydrolysis resistance and heat resistance. Further, in the case of using a polycarbonate diol as a raw material for polyurethanes, thermoplastic elastomers and adhesives, the present invention relates to a polycarbonate diol which easily stabilizes the reaction and can provide a polyurethane and a thermoplastic elastomer having well balanced performances including hydrolysis resistance and heat resistance, excellent physical properties, such as strength and impact resilience, and high flexibility.

BACKGROUND ART

It is known that polyurethane, a thermoplastic elastomer and the like excellent in hydrolysis resistance, light resistance, oxidative degradation resistance, heat resistance and the like are obtained when polycarbonate diols are used as a soft segment thereof. However, since a polycarbonate diol using 1,6-hexanediol as a raw material is highly crystalline, the polycarbonate diol cannot be used as a raw material for coating materials. In order to solve these problems, an aliphatic copolycarbonate diol using two or more types of diols is disclosed. Particularly among them, an aliphatic copolycarbonate diol using 1,5-pentanediol attracts attention as a polycarbonate diol which has a low crystallinity and can provide a polyurethane and a thermoplastic elastomer excellent in flexibility and elastic recovery (see PATENT DOCUMENT 1).

In the case where a polycarbonate diol is used as a raw material for polyurethanes, thermoplastic elastomers, urethane elastic fibers and the like, or as a constituent material for coating materials, adhesives and the like, the polycarbonate diol is reacted with a compound having a functional group reactive with a hydroxyl group, such as an isocyanate. Herein, stabilizing the reaction of the compound having a functional group reactive with a hydroxyl group with the polycarbonate diol is very important from the viewpoint of the production and the product quality. A polycarbonate diol is easily macromolecularized by the above-mentioned reaction, and in order to obtain a target molecular weight, a high technology to control the reaction is conventionally needed. There further arises such a problem that the polycarbonate diol is partially macromolecularized and produces fine gel, which imparts a problem to the product quality. On the other hand, in the case of a low reaction rate, since the macromolecularization hardly occurs and the molecular weight distribution broadens, there also arise problems of the tackiness of the surface due to low-molecular weight substances and of decreased physical properties such as strength and impact resilience.

In order to control the reaction rate in the above-mentioned reaction, various types of polycarbonate diols and manufacturing methods thereof have been disclosed hitherto. For example, there is disclosed a manufacturing method of a reactivity-stabilized polycarbonate diol using a carbonate containing a moisture content made to be 15 ppm or less as a raw material (see PATENT DOCUMENT 2). The method requires a dehydration process for the carbonate, and additionally cannot provide a sufficient effect on the reaction stabilization in some cases.

On the other hand, as methods paying attention to terminals of polycarbonate diols, there are disclosed, for example, methods for manufacturing a polycarbonate diol whose terminals are almost completely consisting of hydroxyl groups by using a dialkyl carbonate or a diaryl carbonate, and a polyhydroxyl compound as raw materials (see PATENT DOCUMENTS 3 and 4). These methods aim at solving a problem that, in the case where a polycarbonate diol is manufactured using a dialkyl carbonate or a diaryl carbonate as a carbonate raw material, alkyl groups or aryl groups originated from the carbonate remain at polymer terminals, and thereby manufacturing a polycarbonate diol whose polymer terminals are almost all hydroxyl groups. However, PATENT DOCUMENTS 3 and 4 do not describe the type of the hydroxyl group at the polymer terminal and the control thereof, nor to the control of the reaction of the polycarbonate diol with a compound having a functional group reactive with a hydroxyl group.

A polycarbonate diol having a high primary terminal OH ratio is further disclosed (see PATENT DOCUMENT 5). However, in the case of a high primary terminal OH ratio, there arises such a problem that the reaction rate often becomes too high and the polycarbonate diol is partially macromolecularized and produces fine gel. There is also disclosed a polycarbonate diol whose hydroxyl group ratio of the polymer terminal is made to be a specified value (see PATENT DOCUMENT 6). However, with the disclosed ratio of the polymer terminal hydroxyl group, a high-molecular weight polyurethane cannot be manufactured in some cases; and only the ratio of the polymer terminal hydroxyl group is specified and there is no description regarding primary hydroxyl groups in the hydroxyl groups in PATENT DOCUMENTS 5 and 6.

As described above, technologies to date cannot present a polycarbonate diol which can provide a coating film exhibiting no feeling of roughness originated from fine gelatinous substances and no feeling of tackiness originated from low-molecular weight substances, and further having well balanced performances including hydrolysis resistance and heat resistance. The technologies also cannot present a polycarbonate diol which easily stabilizes the reaction and can provide a polyurethane and a thermoplastic elastomer having well balanced performances including hydrolysis resistance and heat resistance; excellent physical properties, such as strength and impact resilience; and high flexibility.

PATENT DOCUMENT 1: Japanese Patent No. 1822688
PATENT DOCUMENT 2: JP 2006-176704 A
PATENT DOCUMENT 3: U.S. Pat. No. 7,112,693
PATENT DOCUMENT 4: Japanese Patent No. 3724561
PATENT DOCUMENT 5: Japanese Patent No. 3874664
PATENT DOCUMENT 6: JP 2006-104253 A

DISCLOSURE OF THE INVENTION

Problems to be Solved by the Invention

The present invention relates to a polycarbonate diol suitable as a constituent material of coating materials and further as a raw material for polyurethane, thermoplastic elastomer and the like. Particularly, in the case of using a polycarbonate diol as a constituent material of coating materials, the present invention has an object to provide a polycarbonate diol which can provide a coating film exhibiting no feeling of roughness originated from fine gelatinous substances and no feeling of tackiness originated from low-molecular weight substances, and further having well balanced performances including hydrolysis resistance and heat resistance. Further, in the case of using a polycarbonate diol as a raw material for polyurethanes and thermoplastic elastomers, the present invention has another object to provide a polycarbonate diol which easily stabilizes the reaction and can provide a polyurethane and a thermoplastic elastomer having well balanced performances including hydrolysis resistance and heat resistance; excellent physical properties, such as strength and impact resilience; and high flexibility.

Means for Solving the Problems

As a result of intensive studies to solve the above-mentioned problems, the present inventors have found that, in a polycarbonate diol containing repeating units represented by the following formula (A) and terminal hydroxyl groups, making the primary terminal OH ratio in a specified range can stabilize the reactivity of the polycarbonate diol with a compound having a functional group reactive with a hydroxyl group. This finding has achieved the present invention.

That is, the present invention relates to the following three aspects (1) to (3).

(1) A polycarbonate diol comprising repeating units represented by the following formula (A) and a terminal hydroxyl group, characterized in that from 60 to 100 mol % of the repeating units represented by the formula (A) are repeating units represented by the following formula (B) or (C); the amount of the repeating units represented by the formula (B) is 10 mol % or higher and lower than 50 mol % based on the total amount of the repeating units represented by the formula (A); and the polycarbonate diol has a primary terminal OH ratio of from 95 to 98.5%.

[Formula 1]

(A)

(In the formula, R represents a divalent aliphatic or alicyclic hydrocarbon having 2 to 12 carbon atoms.)

[Formula 2]

(B)

[Formula 3]

(C)

(2) The polycarbonate diol according to (1), wherein the sum of the primary terminal OH ratio and the secondary terminal OH ratio is 98.5% or higher.

(3) The polycarbonate diol according to (1) or (2), wherein from 90 to 100 mol % of the repeating units represented by the formula (A) are repeating units represented by the formula (B) or (C); the amount of the repeating units represented by the formula (B) is 25 mol % or higher and lower than 50 mol % based on the total amount of the repeating units represented by the formula (A); and the polycarbonate diol has a number-average molecular weight of from 300 to 20,000.

Effect of the Invention

The present invention relates to a polycarbonate diol suitable as a constituent material of coating materials and further as a raw material for polyurethanes, thermoplastic elastomers and the like. Particularly, in the case of using a polycarbonate diol as a constituent material of coating materials, the present invention has an advantage capable of providing a polycarbonate diol which can provide a coating film exhibiting no feeling of roughness originated from fine gelatinous substances and no feeling of tackiness originated from low-molecular weight substances, and further having well balanced performances including hydrolysis resistance and heat resistance. Further, in the case of using a polycarbonate diol as a raw material for polyurethanes, thermoplastic elastomers and adhesives, the present invention has another advantage capable of providing a polycarbonate diol which easily stabilizes the reaction and can provide a polyurethane and a thermoplastic elastomer having well balanced performances including hydrolysis resistance and heat resistance; excellent physical properties, such as strength and impact resilience; and high flexibility.

BEST MODE FOR CARRYING OUT THE INVENTION

Hereinafter, the present invention will be described specifically.

In the case of using a polycarbonate diol as a constituent material of coating materials, a curing agent having a functional group reactive with a hydroxyl group, such as an isocyanate, is used. Stabilization of the reaction of such a compound and the polycarbonate diol is very important. As shown in "Stabilization and Anti Degradation Measures and New Purposive Modification Technology of Polyurethane" (Technical Information Institute Co., Ltd., 2004, p. 325, (in Japanese)), it is known that the primary OH group has a higher reactivity with an isocyanate than the secondary OH group or the like. A large amount of primary OHs in molecular terminals of a polycarbonate diol make the reaction stabilization difficult, and depending on the type of the curing agent and the drying condition, there arises a problem where the polycarbonate diol is partially macromolecularized and produces fine gel and impairs the smoothness of the coating film surface. By contrast, with a small amount of primary OHs in molecular terminals of a polycarbonate diol, there arises a problem where the reaction is retarded and the drying time is prolonged. Further, since the molecular weight distribution broadens, a feeling of tackiness remains on the coating film due to low-molecular weight substances in some cases. In the present invention, an optimum value of the primary terminal OH ratio in a polycarbonate diol has found, which allows providing a coating film having well balanced performances including hydrolysis resistance and heat resistance without causing the above-mentioned problems.

Also in the case of using a polycarbonate diol as a raw material for polyurethanes, thermoplastic elastomers, urethane elastic fibers and the like, the polycarbonate diol is reacted with a compound having a functional group reactive with a hydroxyl group, such as an isocyanate. In the case of using the polycarbonate diol according to the present invention, it is possible to stabilize the reaction of such a compound with the polycarbonate diol, and no fine gel and little amount of low-molecular weight substances are produced. Therefore, a polyurethane and a thermoplastic elastomer exhibiting no feeling of roughness and no feeling of tackiness on their surfaces, and further having well balanced performances including hydrolysis resistance and heat resistance; excellent physical properties, such as strength and impact resilience; and high flexibility can be provided.

The primary terminal OH ratio in the present invention means a value calculated by the following formula (1) from values of peak areas of a chromatogram obtained by subjecting a recovered solution to the gas chromatography (GC) analysis, wherein the recovered solution is obtained by heating a polycarbonate diol (70 g to 100 g) at a pressure of 0.4 kPa or lower and at a temperature of from 160° C. to 200° C. under stirring to obtain a fraction of an amount corresponding to about 1 to 2% by weight of the polycarbonate diol, that is, a fraction of about 1 g (0.7 to 2 g), and recovering the fraction using about 100 g (95 to 105 g) of ethanol as a solvent.

Primary terminal OH ratio (%)=$B/A \times 100$ (1)

A: the sum of the peak areas of alcohols (excluding ethanol) including diols
B: the sum of the peak areas of the diols having primary OH groups at both terminals thereof.

The primary terminal OH ratio is a proportion of primary OH groups to all the terminal groups of the polycarbonate diol. That is, as described above, heating a polycarbonate diol at a pressure of 0.4 kPa or lower and at a temperature of from 160° C. to 200° C. makes terminal parts of the polycarbonate diol leave as alcohols, which evaporate and are obtained as a fraction (see the following formula (a)).

[Formula 4]

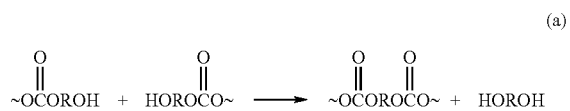

(a)

(In the formula, R represents a hydrocarbon.)

The proportion of diols both terminals of which are primary OH groups to all the alcohols in the fraction is the primary terminal OH ratio.

The primary terminal OH ratio of the polycarbonate diol according to the present invention is from 95% to 98.5%. If the primary terminal OH ratio is in the range described above, in the case of using the polycarbonate diol as a constituent material of coating materials, not depending on the type of the curing agent and the drying condition, a coating film which exhibits no feeling of roughness originated from fine gelatinous substances and no feeling of tackiness originated from low-molecular weight substances, and has well balanced performances including hydrolysis resistance and heat resistance can be obtained. Further, in the case of using the polycarbonate diol as a raw material for polyurethanes, thermoplastic elastomers and the like, the polycarbonate diol stabilizes the reaction and is not partially macromolecularized and produces no fine gel, and can provide a product having excellent physical properties, such as strength and impact resilience, and high flexibility. If the primary terminal OH ratio exceeds 98.5%, depending on the type of the curing agent and the drying condition, fine high-molecular weight gel is produced and a feeling of roughness is generated on the coating film. By contrast, with the primary terminal OH ratio of less than 95%, an elongated time is often needed for drying, and since the molecular weight distribution broadens, a feeling of tackiness is often generated on the coating film due to low-molecular weight substances. In the case of the primary terminal OH ratio of from 96% to 98.5%, the above-mentioned problems hardly occur, which is preferable. The case of the primary terminal OH ratio of from 97% to 98.5% is most preferable.

A method for manufacturing the polycarbonate diol according to the present invention is not especially limited. The polycarbonate diol can be manufactured by one of various methods, for example, cited in Schnell, Polymer Reviews, vol. 9, pp. 9-20 (1994).

The polycarbonate diol according to the present invention is manufactured using 1,5-pentanediol and 1,6-hexanediol as diol raw materials. In addition to these diols, one or two or more other diol(s) selected from diols having no side chain such as ethylene glycol, 1,3-propanediol, 1,4-butanediol, 1,7-heptanediol, 1,8-octanediol, 1,9-nonanediol, 1,10-dodecanediol, 1,11-undecanediol and 1,12-dodecanediol; diols having a side chain such as 2-methyl-1,8-octanediol, 2-ethyl-1,6-hexandiol, 2-methyl-1,3-propanediol, 3-methyl-1,5-pentanediol, 2,4-dimethyl-1,5-pentanediol, 2,4-diethyl-1,5-pentanediol, 2-butyl-2-ethyl-1,3-propanediol and 2,2-dimethyl-1,3-propanediol; and cyclic diols such as 1,4-cyclohexane dimethanol and 2-bis(4-hydroxycyclohexyl)-propane may be used as raw material(s). The amount is not especially limited as long as the proportion of the repeating units set forth in the present invention is satisfied.

A compound having 3 or more hydroxyl groups in one molecule thereof, for example, trimethylolethane, trimethylolpropane, hexanetriol and pentaerythritol, may be also used in the range not impairing the performances of the polycarbonate diol according to the present invention. Use of an excessive amount of such a compound having 3 or more hydroxyl groups in one molecule thereof results in crosslinking causing gelation during the polymerization reaction of the polycarbonate. Therefore, the compound having 3 or more hydroxyl groups in one molecule thereof is preferably 0.1 to 5% by weight, and more preferably 0.1 to 2% by weight, based on the total amount of the diols as raw materials.

Carbonates for the polycarbonate diol according to the present invention include dialkyl carbonates such as dimethyl carbonate, diethyl carbonate, dipropyl carbonate and dibutyl carbonate; diaryl carbonates such as diphenyl carbonate; and alkylene carbonates such as ethylene carbonate, trimethylene carbonate, 1,2-propylene carbonate, 1,2-butylene carbonate, 1,3-butylene carbonate and 1,2-pentylene carbonate. One carbonate or two or more carbonates among these can be used as raw material(s). In the case of using a dialkyl carbonate and/or a diaryl carbonate, depending on conditions such as the charge ratio between the diol and the carbonate, a polycarbonate diol having the primary terminal OH ratio according to the present invention can easily be obtained, which is preferable. From the viewpoint of ease of availability and ease of setting conditions for the polymerization reaction, use of dimethyl carbonate, diethyl carbonate, diphenyl carbonate or dibutyl carbonate is further preferable.

In the manufacture of the polycarbonate diol according to the present invention, a catalyst may be added or not. In the case of adding a catalyst, the catalyst can be selected from common transesterification catalysts without specific limitations. Catalysts used are, for example, metals such as lithium, sodium, potassium, rubidium, cesium, magnesium, calcium, strontium, barium, zinc, aluminum, titanium, cobalt, germanium, tin, lead, antimony, arsenic and cerium, and salts, alkoxides and organic compounds thereof. Especially preferable are compounds of titanium, tin or lead. The use amount of the catalyst is commonly from 0.00001 to 0.1% of the weight of the polycarbonate diol.

As an example of the manufacturing method, a method using dimethyl carbonate as a carbonate will be described. Manufacture of the polycarbonate diol is carried out in two stages. A diol and dimethyl carbonate are mixed in a proportion of 20:1 to 1:10 in molar ratio, and reacted at ordinary pressure or reduced pressure at from 100 to 300° C.; and methanol produced is removed as a mixture with dimethyl carbonate to obtain a low-molecular weight polycarbonate diol. Then, the low-molecular weight polycarbonate diol is made to self-condensate while the unreacted diol and dimethyl carbonate are removed, by heating at from 160 to 250° C., at reduced pressure to obtain a polycarbonate diol of predetermined molecular weight.

The polycarbonate diol having the primary terminal OH ratio according to the present invention can be obtained by selecting a method or suitably combining methods from the polymerization conditions including the purity of a raw material diol, the temperature and the time, and further in the case of using a dialkyl carbonate and/or a diaryl carbonate as a carbonate, from conditions such as the charge ratio between the diol and the carbonate. Industrially obtained 1,5-pentanedial contains from 0.2 to 2% by weight each of 1,5-hexanediol and 1,4-cyclohexanediol as impurities having a secondary hydroxyl group. On the other hand, 1,6-hexanediol industrially obtained contains from 0.1 to 2% by weight of impurities having a secondary hydroxyl group such as 1,4-cyclohexanediol. Since these diols having a secondary hydroxyl group have a low transesterification reactivity in the manufacture of a polycarbonate diol, the diols tend to become a terminal group of the polycarbonate diol, resulting in a polycarbonate diol having a secondary hydroxyl group at a terminal thereof. Further, in the case of using a dialkyl carbonate and/or a diaryl carbonate as a carbonate, if the reaction is carried out by placing a diol and a carbonate in a stoichiometric or near-stoichiometric proportion in accordance with the molecular weight of the target polycarbonate diol, alkyl groups or aryl groups originated from the carbonate tend to remain at terminals of the polycarbonate diol. Then, setting the amount of the diols based on the carbonates at 1.01 to 1.30 times the stoichiometric amount can decrease alkyl group or aryl group terminals remaining at terminals of the polycarbonate diol, and make the terminals hydroxyl groups. Further, side reactions sometimes make terminals of the polycarbonate diol vinyl groups, and in the case of using, for example, dimethyl carbonate as a carbonate, methyl esters or methyl ethers. Generally, side reactions more easily occur at a higher reaction temperature and for a longer reaction time.

Control of the primary terminal OH ratio is preferably so carried out that molecular terminals other than those of the predetermined primary terminal OH ratio become secondary hydroxyl groups. In the case where a terminal of a polycarbonate diol is an alkyl group, an aryl group, or a vinyl group originated from the carbonate, the polycarbonate diol functions as a chain terminator in the reaction of the polycarbonate diol with a crosslinking agent reactive with a hydroxyl group, such as an isocyanate. Therefore, the molecular weight distribution broadens and a feeling of tackiness is generated on the surface in some cases. The strength and impact resilience of the polyurethane and the thermoplastic elastomer is impaired in some cases.

The secondary terminal OH ratio in the present invention means a value calculated by the following formula (2) from peak area values of a chromatograph obtained by the same analysis as that of the primary terminal OH ratio.

$$\text{Secondary terminal OH ratio (\%)} = C/A \times 100 \qquad (2)$$

A: the sum of the peak areas of alcohols (excluding ethanol) including diols
C: the sum of the peak areas of the diols having at least one secondary hydroxyl group In the case where a polymer terminal is a secondary hydroxyl group, a diol in which a hydroxyl group of at least one terminal is secondary leaves the polymer terminal (see the following formula (b)).

[Formula 5]

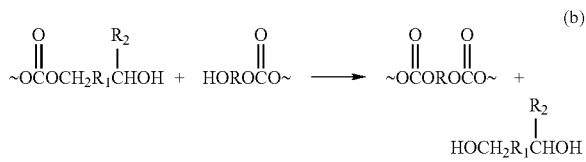

(b)

(In the formula, R, $R_1$ and $R_2$ each represent a hydrocarbon.

The proportion of diols at least one hydroxyl group of which is secondary to all alcohols in the fraction is the secondary terminal OH ratio.

In the polycarbonate diol according to the present invention, the sum of the primary terminal OH ratio and the secondary terminal OH ratio is preferably 98.5% or higher. If the sum of the primary terminal OH ratio and the secondary terminal OH ratio is 98.5% or higher, low-molecular weight substances are not produced in a large amount and a feeling of tackiness does not appear on the coating film, which is preferable. Further, the molecular weight distribution of the polyurethane or the thermoplastic elastomer does not broaden and the strength and the impact resilience thereof do not decrease, which is preferable. If the sum of the primary terminal OH ratio and the secondary terminal OH ratio is 99.0% or higher, not depending on the type of a curing agent and the drying condition, the feeling of tackiness of the coating film does not exist, and also in the case of using the polycarbonate diol as a raw material for a polyurethane or a thermoplastic elastomer, a product having a target molecular weight can be obtained without being influenced by the isocyanate used and the reaction condition, which is more preferable. The case where the sum of the primary terminal OH ratio and the secondary terminal OH ratio is 99.5% or higher is most preferable.

In order to control the primary terminal OH ratio and/or the secondary terminal OH ratio, a diol having a secondary hydroxyl group may be added according to need. The diol having a secondary hydroxyl group may be added in a raw material, in the course of polycarbonate diol manufacture, or after a predetermined molecular weight is achieved. In a method in which a diol having a secondary hydroxyl group is added to an obtained polycarbonate diol and the mixture is heated, the heat treatment temperature is from 120° C. to 190° C., and preferably from 130° C. to 180° C. If the heating temperature is lower than 120° C., the reaction is slow and the treatment time is long, which is economically problematic; and if that exceeds 190° C., there is a high possibility of causing problems such as coloration. Although the heat treatment time varies depending on the reaction temperature and the treatment method, it commonly is from 15 min to 10 hours. Diols having a secondary hydroxyl group include diols having a primary hydroxyl group and a secondary hydroxyl group such as 1,2-propanediol, 1,3-butanediol, 1,2-pentanediol, 1,4-pentanediol, 1,2-hexandiol, 1,5-hexandiol, 2-ethyl-1,3-hexandiol, 1,2-octanediol and 1,2-decanediol; diols having two secondary hydroxyl groups such as 1,2-cyclopentanediol, 1,3-cyclopentanediol, 1,3-cyclohexanediol, 1,4-cyclohexanediol, 2,3-butanediol, 2,4-pentanediol, 2,5-hexandiol and 3,5-heptanediol; and diols having one secondary hydroxyl group and one tertiary hydroxyl group such as 2-methyl-2,4-pentanediol. These diols are used singly or as a mixture of two or more.

The polycarbonate diol according to the present invention has a proportion (hereinafter, referred to as C56 proportion) of repeating units represented by the following formula (B) or (C) of 60 to 100 mol % based on the repeating units represented by the following formula (A). If the C56 proportion is in the range described above, a coating film and a polyurethane which exhibit a good balance of physical properties such as hydrolysis resistance and heat resistance, and flexibility can be obtained. In the case of a C56 proportion of 90 to 100 mol %, a coating film and a polyurethane having a higher flexibility can be obtained.

[Formula 6]

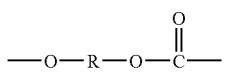
(A)

(In the formula, R represents herein a divalent aliphatic or alicyclic hydrocarbon having 2 to 12 carbon atoms.)

[Formula 7]

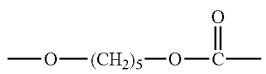
(B)

[Formula 8]

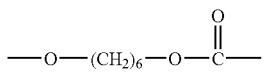
(C)

The polycarbonate diol according to the present invention has a proportion (hereinafter, referred to as C5 proportion) of the repeating units represented by the formula (B) shown above of 10 mol % or higher and lower than 50 mol % based on the total of the repeating units represented by the formula (A) shown above. In the case of a C5 proportion of lower than 10 mol %, the polycarbonate diol has a high crystallinity, which prevents the use of the polycarbonate diol as coating materials. In the case of a C5 proportion of 50 mol % or higher, the density of carbonate bonds in the polymer molecule becomes high and the flexibility of the coating film is impaired due to the intermolecular interaction in some cases, which is not preferable. In the case of a C5 proportion of 25 mol % or higher and lower than 50 mol %, the above-mentioned problems scarcely occur, which is preferable. Further, in the range of 35 mol % or higher and lower than 50 mol %, the crystallinity of the polycarbonate diol becomes further low, which makes it most preferable as a constituent material of coating materials.

With respect to the molecular weight of the polycarbonate diol according to the present invention, the number-average molecular weight is preferably 300 to 20,000. With the number-average molecular weight of 300 or higher, the flexibility and the characteristics at low temperatures of the coating film and the thermoplastic polyurethane are sufficient; and with that of 20,000 or lower, in the case of using it as a constituent material of a coating material, the viscosity of the polycarbonate diol does not become high and the concentration of the coating material solid content and the like are not limited. Further, the moldability of the thermoplastic polyurethane does not decrease, which is preferable. The number-average molecular weight is preferably in the range of from 450 to 5,000, and more preferably from 500 to 3,000.

The number-average molecular weight of the present invention was calculated using the following formula (3) of which a hydroxyl value was determined by "the neutralization titration method (JIS K 0070-1992)", in which acetic anhydride and pyridine are used and the titration is performed with an ethanol solution of potassium hydroxide.

$$\text{Number-average molecular weight}=2/(\text{OH value} \times 10^{-3}/56.1) \quad (3)$$

The polycarbonate diol according to the present invention can be used as a constituent material of coating materials, as a raw material for polyurethanes and thermoplastic elastomers, and for applications such as modifiers for polyesters and polyimides. Particularly, in the case of using the polycarbonate diol as a constituent material of coating materials, a coating film which exhibits no feeling of roughness originated from fine gelatinous substances and no feeling of tackiness originated from low-molecular weight substances, and further has well balanced performances including hydrolysis resistance and heat resistance can be obtained. Further, in the case of using the polycarbonate diol as a raw material for polyurethanes and thermoplastic elastomers, the obtained polyurethanes and thermoplastic elastomers exhibit no feeling of roughness and no feeling of tackiness on their surfaces, and since the polycarbonate diol easily stabilizes the reaction, a polyurethane and a thermoplastic elastomer which have well balanced performances, such as hydrolysis resistance and heat resistance; excellent physical properties, such as strength and impact resilience; and high flexibility can be obtained.

A coating material and a thermoplastic polyurethane can be provided by using the polycarbonate diol according to the present invention and a polyisocyanate.

Polyisocyanates to be used are, for example, publicly known aromatic diisocyanates such as 2,4-tolylene diisocyanate, 2,6-tolylene diisocyanate and mixtures thereof (TDI), crude TDI, diphenylmethane-4,4'-diisocyanate (MDI), crude MDI, naphthalene-1,5-diisocyanate (NDI), 3,3'-dimethyl-4,4'-biphenylene diisocyanate, polymethylene polyphenyl isocyanate, xylylene diisocyanate (XDI) and phenylene diisocyanate; publicly known aliphatic diisocyanates such as 4,4'-methylenebiscyclohexyl diisocyanate (hydrogenated MDI), hexamethylene diisocyanate (HMDI), isophorone diisocyanate (IPDI) and cyclohexane diisocyanate (hydrogenated XDI); and isocyanurate modified products, carbodiimide modified products and biuret modified products of these isocyanates. These organic polyisocyanates may be used singly or in combination of two or more. These organic polyisocyanates may be used having an isocyanate group thereof masked with a blocking agent.

A chain extender can be used as a copolymerization component as desired. As a chain extender, chain extenders in common use in polyurethane industries, that is, water, low-molecular polyols and polyamines, can be used. The chain extenders include, for example, low-molecular polyols such as ethylene glycol, 1,3-propanediol, 1,4-butanediol, 1,5-pentanediol, 1,6-hexanediol, neopentyl glycol, 1,10-decanediol, 1,1-cyclohexane dimethanol, 1,4-cyclohexane dimethanol, xylylene glycol, bis(p-hydroxy)diphenyl and bis(p-hydroxyphenyl)propane; and polyamines such as ethylene diamine, hexamethylene diamine, isophorone diamine, xylylene diamine, diphenyl diamine and diaminodiphenylmethane. These chain extenders may be used singly or in combination of two or more.

As a method for manufacturing the coating materials, manufacturing methods publicly known in the industries are used. For example, a two-component solvent-borne coating composition in which a base agent comprising a polycarbonate diol and a curing agent comprising an organic polyisocyanate are mixed right before the application, a one-component solvent-borne coating composition comprising a urethane prepolymer having an isocyanate terminal group obtained by reacting a polycarbonate diol and an organic polyisocyanate, and a one-component solvent-borne coating composition or a one-component water-borne coating composition comprising a polyurethane resin obtained by reacting a polycarbonate diol, an organic polyisocyanate and a chain extender can be manufactured.

According to various types of applications, a curing accelerator (catalyst), a filler, a dispersant, a flame retardant, a dye, an organic or inorganic pigment, a releasing agent, a fluidity regulator, a plasticizer, an antioxidant, an ultraviolet absorbent, a light stabilizer, a defoaming agent, a leveling agent, a colorant, a solvent and the like may be added.

A solvent or a mixture of a plurality of solvents selected from dimethylformamide, diethylformamide, dimethylacetamide, dimethyl sulfoxide, tetrahydrofuran, acetone, methyl ethyl ketone, methyl isobutyl ketone, dioxane, cyclohexanone, benzene, toluene, xylene, ethyl cellosolve, ethyl acetate, butyl acetate, ethanol, isopropanol, n-butanol, water and the like, can be used as a solvent.

As a method for manufacturing the thermoplastic polyurethane, a technology of the polyurethane reaction publicly known in polyurethane industries is used. The thermoplastic polyurethane can be manufactured, for example, by reacting the polycarbonate diol according to the present invention with an organic polyisocyanate at atmospheric pressure at a temperature of from ordinary temperature to 200° C. In the case of using a chain extender, the chain extender may be added at the start of the reaction, or in the course of the reaction. A manufacturing method of the thermoplastic polyurethane can be referred to, for example, U.S. Pat. No. 5,070,173.

In the polyurethane reaction, a publicly known polymerization catalyst and a solvent may be used.

To the thermoplastic polyurethane, a stabilizer such as a thermal stabilizer (for example, an antioxidant) or a light stabilizer is desirably added. Further may be added a plasticizer, an inorganic filler, a lubricant, a colorant, a silicone oil, a foaming agent, a flame retardant and the like.

EXAMPLES

Then, the present invention will be described by way of Examples and Comparative Examples.

1. Determination of the Primary Terminal OH Ratio

A polycarbonate diol of from 70 g to 100 g was weighed and placed in a 300-mL round-bottom flask, and heated and stirred at a pressure of 0.4 kPa or lower in a heating bath of about 180° C. using a rotary evaporator connected with a trap bulb for fraction recovery, to obtain a fraction corresponding to about 1 to 2% by weight of the polycarbonate diol, that is, about 1 g (0.7 to 2 g) of the fraction in the trap bulb. The fraction was recovered with about 100 g (95 to 105 g) of ethanol as a solvent; and the recovered solution was subjected to a gas chromatography analysis (hereinafter, referred to as GC analysis); and the primary terminal OH ratio was calculated by the following formula (1) from the values of the peak areas of the obtained chromatograph. The GC analysis was conducted using a gas chromatograph 6890 (made by Hewlett-Packard Development Corp., USA) equipped with DB-WAX (made by J & W Scientific Inc., USA) having a length of 30 m and a film thickness of 0.25 μm as a column and using a hydrogen flame ionization detector (FID) as a detector. The heating profile of the column was such that the temperature was raised at 10° C./min from 60° C. to 250° C., and held at the temperature for 15 min. The identification of each peak in the GC analysis was conducted using the following GC-MS apparatus. The GC apparatus 6890 (made by Hewlett-Packard Development Corp., USA) equipped with DB-WAX (made by J & W Scientific Inc., USA) as a column was used; and the temperature was raised at a heating rate of 10° C./min from an initial temperature of 40° C. to 220° C. The MS apparatus used was an Auto-massSUN (made by JEOL Ltd., Japan); and the MS analysis was conducted at an ionization voltage of 70 eV in a scan range of from m/z=10 to 500 and at a photomultiplier gain of 450 V.

$$\text{Primary terminal OH ratio (\%)} = B/A \times 100 \qquad (1)$$

A: the sum of the peak areas of alcohols (excluding ethanol) including diols

B: the sum of the peak areas of the diols having primary OH groups at both terminals thereof 2. Determination of the Secondary Terminal OH Ratio The GC analysis was conducted by the same method as in the primary terminal OH ratio; and the secondary terminal OH ratio was calculated by the following formula (2) from the values of the peak areas of the obtained chromatograph.

$$\text{Secondary terminal OH ratio (\%)} = C/A \times 100 \qquad (2)$$

A: the sum of the peak areas of alcohols (excluding ethanol) including diols

C: the sum of the peak areas of the diols having at least one secondary hydroxyl group 3. Determination of the C56 Proportion and the C5 Proportion A sample in an amount of 1 g was weighed and placed in a 100-mL round-bottom flask; 30 g of ethanol and 4 g of potassium hydroxide were placed therein; and the mixture was heated in an oil bath at 100° C. for 1 hour. The solution was cooled to room temperature, and thereafter, one or two drops of phenolphthalein as an indicator was added thereto and the solution was neutralized with hydrochloric acid. The solution was cooled in a refrigerator for 3 hours and the precipitated salt was removed by filtration, and then the filtrate was subjected to the GC analysis. The GC analysis was conducted using a gas chromatograph GC14B (made by Shimadzu Corp.) equipped with DB-WAX (made by J & W Scientific Inc., USA) having a length of 30 m and a film thickness of 0.25 μm as a column, diethylene glycol diethyl ester as an internal standard, and a hydrogen flame ionization detector (FID) as a detector. The heating profile of the column was such that the temperature was held at 60° C. for 5 min, and thereafter raised at 10° C./min to 250° C.

The C56 proportion was determined by the following formula (4) based on the result of the GC analysis.

$$C56 \text{ proportion (mol \%)} = E/D \times 100 \qquad (4)$$

D: the total number of moles of the diols

E: the number of moles of 1,5-pentanediol and 1,6-hexanediol

The C5 proportion was determined by the following formula (5) based on the result of the GC analysis.

$$C5 \text{ proportion (mol \%)} = F/D \times 100 \qquad (5)$$

D: the total number of moles of the diols
F: the number of moles of 1,5-pentanediol 4. Purity Analysis of Diol Raw Materials The 1,4-butanediol, the 1,5-hexanediol and the 1,6-hexanediol used as diol raw materials were subjected to the gas chromatography analysis conducted under such conditions that a gas chromatograph GC-14B (made by Shimadzu Corp.) equipped with DB-WAX (made by J & W Scientific Inc.) as a column, diethylene glycol diethyl ester as an internal standard, and FID as a detector were used. The heating profile of the column was such that the temperature was held at 60° C. for 5 min, and thereafter raised at 10° C./min to 250° C.

The purity of the 1,4-butanediol was 99.5% by weight, and the remaining 0.5% by weight gave a plurality of unknown peaks. The 1,5-pentanediol had a purity of 97.6% by weight and contained 1.7% by weight of 1,5-hexanediol and 0.5% by weight of 1,4-cyclohexanediol. The remaining 0.2% by weight was a plurality of unknown substances. The 1,6-hexanediol had a purity of 98.9% by weight and contained 0.8% by weight of 1,4-cyclohexanediol. The remaining 0.3% by weight was a plurality of unknown substances.

5. Evaluations of the Coating Film Surface

Evaluations of the coating film surface were performed using a feeling of tackiness and a feeling of roughness. The evaluation was performed by five inspectors; and touch feeling by hand on the coating film surface was evaluated as points based on the following judgment standards and expressed as its average point.

(1) Feeling of Tackiness

No tackiness was defined as 0 point and a strong feeling of tackiness was defined as 5 points; and points were graded in 0 to 5 points.

(2) Feeling of Roughness

No feeling of roughness was defined as 0 point and a feeling of roughness over the whole was defined as 5 points; and points were graded in 0 to 5 points.

6. Evaluations of the Molecular Weight and Physical Properties of the Thermoplastic Polyurethane (1) Number-Average Molecular Weight and Weight-Average Molecular Weight These were evaluated by GPC using a calibration curve obtained for standard polystyrenes.

(2) Shore D Hardness (No Unit)

The Shore D harness was measured according to ASTM D2240 D type at 23° C.

(3) Tensile Strength (kgf/cm$^2$)

The tensile strength was measured according to JIS K6251 using No. 3 dumbbell. A press sheet of 2 mm in thickness was used as a test piece.

(4) Elongation (%)

The elongation was measured according to JIS K6251 using No. 3 dumbbell. A press sheet of 2 mm in thickness was used as a test piece.

(5) Impact Resilience (%)

The impact resilience was measured according to JIS K6255 using Lupke pendulum at 23° C.

Example 1

In a 2-L glass flask equipped with a rectifying tube filled with structured packings and a stirrer, 500 g (5.6 mol) of dimethyl carbonate, 330 g (3.2 mol) of 1,5-pentanediol and 300 g (2.5 mol) of 1,6-hexanediol were placed. As a catalyst, 0.10 g of titanium tetrabutoxide was added thereto, and the mixture was stirred and heated at ordinary pressure. The reaction was performed for 10 hours while the reaction temperature was gradually raised from 150° C. to 190° C. and while a mixture of produced methanol and dimethyl carbonate was being distilled out. Thereafter, the pressure was reduced to 15 kPa and the reaction was performed at 190° C. further for 7 hours while the mixture of methanol and dimethyl carbonate was being distilled out. The analysis results of the obtained polycarbonate diol are shown in Table 1. The polycarbonate diol is abbreviated as PC-1.

Comparative Example 1

The reaction was performed using the apparatus indicated in Example 1. In the apparatus, 560 g (6.2 mol) of dimethyl carbonate, 330 g (3.2 mol) of 1,5-pentanediol, 300 g (2.5 mol) of 1,6-hexanediol and 10 g (0.1 mol) of 1,4-cyclohexanediol were placed. As a catalyst, 0.11 g of titanium tetrabutoxide was added thereto, and the mixture was stirred and heated at ordinary pressure. The reaction was performed for 8 hours while the reaction temperature was gradually raised from 150° C. to 195° C. and while a mixture of produced methanol and dimethyl carbonate was being distilled out. Thereafter, the pressure was reduced to 18 kPa and the reaction was performed at 195° C. further for 5 hours while the mixture of methanol and dimethyl carbonate was being distilled out. The analysis results of the obtained polycarbonate diol are shown in Table 1. The polycarbonate diol is abbreviated as PC-5.

Example 2

The polymerization was performed using the apparatus indicated in Example 1. In the apparatus, 650 g (5.5 mol) of diethyl carbonate, 170 g (1.6 mol) of 1,5-pentanediol, 300 g (2.5 mol) of 1,6-hexanediol and 100 g (1.1 mol) of 1,4-butanediol were placed. As a catalyst, 0.10 g of titanium tetrabutoxide was added thereto, and the mixture was stirred and heated at ordinary pressure. The reaction was performed for 10 hours while the reaction temperature was gradually raised from 150° C. to 190° C. and while a mixture of produced ethanol and diethyl carbonate was being distilled out. Thereafter, the pressure was reduced to 16 kPa and the reaction was performed at 190° C. further for 7 hours while the mixture of ethanol and diethyl carbonate was being distilled out. The analysis results of the obtained polycarbonate diol are shown in Table 1. The polycarbonate diol is abbreviated as PC-2.

Example 3

In a 2-L glass flask equipped with a rectifying tube filled with structured packings and a stirrer, 450 g (5.1 mol) of ethylene carbonate, 120 g (1.2 mol) of 1,5-pentanediol and 470 g (4.0 mol) of 1,6-hexanediol were placed. As a catalyst, 0.11 g of titanium tetrabutoxide was added thereto, and the mixture was stirred and heated at ordinary pressure. The reaction was performed for 10 hours while the reaction temperature was gradually raised from 150° C. to 190° C. and while a mixture of produced ethylene glycol and ethylene carbonate was being distilled out. Thereafter, the pressure was reduced to 14 kPa and the reaction was performed at 190° C. further for 7 hours while the mixture of the diol and ethylene carbonate was being distilled out. The analysis results of the obtained polycarbonate diol are shown in Table 1. The polycarbonate diol is abbreviated as PC-3.

As raw materials, 1,5-pentanediol and 1,6-hexanediol were refined by distillation. The 1,5-pentanediol had a purity of 98.7% by weight, and contained 0.8% by weight of 1,5-hexanediol and 0.3% by weight of 1,4-cyclohexanediol. The remaining 0.2% by weight was a plurality of unknown substances. The 1,6-hexanediol had a purity of 99.5% by weight and contained 0.3% by weight of 1,4-cyclohexanediol. The remaining 0.2% by weight was a plurality of unknown substances. In Example 4 and Comparative Example 2, raw materials refined by the distillation were used.

Example 4

The polymerization was performed using the apparatus indicated in Example 1. In the apparatus, 640 g (5.4 mol) of diethyl carbonate, 120 g (1.2 mol) of 1,5-pentanediol and 470 g (4.0 mol) of 1,6-hexanediol were placed. As a catalyst, 0.12 g of titanium tetrabutoxide was added thereto, and the mixture was stirred and heated at ordinary pressure. The reaction was performed for 10 hours while the reaction temperature was gradually raised from 150° C. to 190° C. and while a mixture of produced ethanol and diethyl carbonate was being distilled out. Thereafter, the pressure was reduced to 16 kPa and the reaction was performed at 190° C. further for 7 hours while the mixture of ethanol and diethyl carbonate was being distilled out. The analysis results of the obtained polycarbonate diol are shown in Table 1. The polycarbonate diol is abbreviated as PC-4.

Corp.) in an amount of 8 g was added thereto, and mixed to prepare a coating liquid. The liquid was applied on an acrylonitrile-butadiene-styrene (ABS) resin plate, and heat cured at 80° C. for 3 hours to obtain a coating film of 30 to 40 μm in film thickness.

Application Examples 2 to 6

Coating films were obtained by the method indicated in Application Example 1, except for using PC-2 to PC-6 as polycarbonate diols.

The coating films obtained in Application Examples 1 to 6 were further allowed to stand at room temperature for 1 week, and thereafter evaluated for the feeling of roughness and feeling of tackiness of the coating films. The results are summarized in Table 2.

TABLE 2

| | Application Example 1 | Application Example 2 | Application Example 3 | Application Example 4 | Application Example 5 | Application Example 6 |
|---|---|---|---|---|---|---|
| Polycarbonate Diol | PC-1 | PC-2 | PC-3 | PC-4 | PC-5 | PC-6 |
| Feeling of Roughness | 0 | 0 | 0 | 0 | 0 | 2.8 |
| Feeling of Tackiness | 0.8 | 1.2 | 0.4 | 1.6 | 3.8 | 0.2 |

Comparative Example 2

In a 2-L glass flask equipped with a rectifying tube filled with structured packings and a stirrer, 450 g (5.1 mol) of ethylene carbonate, 120 g (1.2 mol) of 1,5-pentanediol and 470 g (4.0 mol) of 1,6-hexanediol were placed. As a catalyst, 0.11 g of titanium tetrabutoxide was added thereto, and the mixture was stirred and heated at ordinary pressure. The reaction was performed for 15 hours while the reaction temperature was gradually raised from 150° C. to 180° C. and while a mixture of produced ethylene glycol and ethylene carbonate was being distilled out. Thereafter, the pressure was reduced to 12 kPa and the reaction was performed at 180° C. further for 12 hours while the mixture of the diol and ethylene carbonate was being distilled out. The analysis results of the obtained polycarbonate diol are shown in Table 1. The polycarbonate diol is abbreviated as PC-6.

Application Example 7

In a reactor equipped with a stirrer, a thermometer and a cooling tube, 200 g of PC-1 obtained in Example 1 and 63.8 g of hexamethylene diisocyanate were placed and reacted at 100° C. for 4 hours to obtain an NCO-terminated prepolymer. To the prepolymer, 26.8 g of 1,4-butanediol as a chain extender and 0.01 g of dibutyltin laurate as a catalyst were added, reacted at 140° C. for 60 min using a laboratory-scale universal extruder equipped with a built-in kneader (laboratory-scale universal extruder KR-35, made by Kasamatsu Plastic Engineering and Research Co., Ltd., Japan), and thereafter pelletized by the extruder. Evaluation results of the number-average molecular weight and the weight-average molecular weight in terms of polystyrene by GPC and the physical properties of the obtained thermoplastic polyurethane are shown in Table 3.

TABLE 1

| | Example 1 | Example 2 | Example 3 | Example 4 | Comparative Example 1 | Comparative Example 2 |
|---|---|---|---|---|---|---|
| Number-Average Molecular Weight | 1930 | 2010 | 1980 | 2010 | 1940 | 1990 |
| Primary Terminal OH ratio (%) | 95.4 | 95.1 | 97.1 | 97.4 | 90.8 | 99.1 |
| Secondary Terminal OH ratio (%) | 3.1 | 2.3 | 2.4 | 0.8 | 6.1 | 0.8 |
| C56 Proportion (mol %) | 99 | 79 | 99 | 100 | 98 | 100 |
| C5 Proportion (mol %) | 53 | 28 | 20 | 19 | 52 | 19 |
| Abbreviation of Polycarbonate Diol | PC-1 | PC-2 | PC-3 | PC-4 | PC-5 | PC-6 |

Application Example 1

To a mixed solvent of xylene/butyl acetate (70/30), 40 g of PC-1 obtained in Example, 0.75 g of a leveling agent (BYK-331, made by BYK-Chemie GmbH) and 1.00 g of dibutyltin dilaurate (Air Product and Chemicals, Inc.) were added such that a final coating solid content becomes 50%, and the mixture was stirred to obtain a coating base agent. A curing agent (Duranate™ TPA-100, made by Asahi Kasei Chemicals Application Examples 8 to 11

Thermoplastic polyurethanes were obtained by the method indicated in Application Example 7, except for using PC-2 to PC-6 as polycarbonate diols. Evaluation results of the number-average molecular weight and the weight-average molecular weight in terms of polystyrene by GPC and the physical properties of each obtained thermoplastic polyurethane are shown in Table 3. In the case of using PC-6, since the obtained thermoplastic polyurethane had an extremely low strength due to production of fine gel, the subsequent evaluation was not performed.

TABLE 3

|  | Application Example 7 | Application Example 8 | Application Example 9 | Application Example 10 | Application Example 11 |
|---|---|---|---|---|---|
| Polycarbonate Diol | PC-1 | PC-2 | PC-3 | PC-4 | PC-5 |
| Number-Average Molecular Weight ($10^4$ Mn) | 5.8 | 5.6 | 6.2 | 5.7 | 4.2 |
| Weight-Average Molecular Weight ($10^4$ Mw) | 12.0 | 11.8 | 12.1 | 10.8 | 10.1 |
| Hardness (Shore D) | 38 | 39 | 39 | 38 | 37 |
| Tensile Strength (MPa) | 27 | 27 | 29 | 26 | 18 |
| Elongation (%) | 710 | 640 | 690 | 630 | 540 |
| Impact Resilience (%) | 50 | 49 | 51 | 50 | 42 |

The thermoplastic polyurethane obtained in Application Example 11 exhibited a feeling of tackiness, but the thermoplastic polyurethanes obtained in Application Examples 7 to 10 exhibited no feeling of tackiness.

INDUSTRIAL APPLICABILITY

The polycarbonate diol according to the present invention can be utilized as a constituent material of coating materials and further as a raw material for polyurethanes, thermoplastic elastomers and the like. Particularly, in the case of using the polycarbonate diol as a constituent material of coating materials, the polycarbonate diol can provide a coating film exhibiting no feeling of roughness originated from fine gelatinous substances and no feeling of tackiness originated from low-molecular weight substances, and further having well balanced performances including hydrolysis resistance and heat resistance. Further, in the case of using the polycarbonate diol as a raw material for polyurethanes, thermoplastic elastomers and adhesives, the polycarbonate diol easily stabilizes the reaction and can provide a polyurethane and a thermoplastic elastomer having well balanced performances including hydrolysis resistance and heat resistance; excellent physical properties such as strength and impact resilience; and high flexibility.

The invention claimed is:

1. A polycarbonate diol comprising
   (a) repeating units represented by the following formula (A):

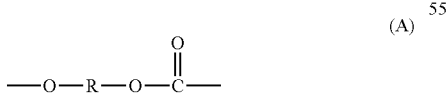

(A)

wherein in the formula A, R represents a divalent aliphatic or alicyclic hydrocarbon having 2 to 12 carbon atoms, and
   (b) a terminal hydroxyl group,
characterized in that: from 60 to 100 mol % of the repeating units represented by the formula (A) are repeating units represented by the following formula (B) or (C):

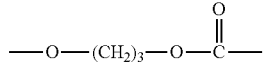

(B)

-continued

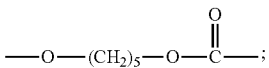

(C)

the amount of the repeating units represented by the formula (B) is 10 mol % or higher and lower than 50 mol % based on the total amount of the repeating units represented by the formula (A); and
the polycarbonate diol has a primary terminal OH ratio of from 95 to 98.5%.

2. The polycarbonate diol according to claim 1, having a primary terminal OH ratio and a secondary terminal OH ratio sum of 98.5% or higher.

3. The polycarbonate diol according to claim 1,
wherein from 90 to 100 mol % of the repeating units represented by the formula (A) are repeating units represented by the formula (B) or (C);
the amount of the repeating units represented by the formula (B) is 25 mol % or higher and lower than 50 mol % based on the total amount of the repeating units represented by the formula (A); and
the polycarbonate diol has a number-average molecular weight of from 300 to 20,000.

4. The polycarbonate diol according to claim 2,
wherein from 90 to 100 mol % of the repeating units represented by the formula (A) are repeating units represented by the formula (B) or (C);
the amount of the repeating units represented by the formula (B) is 25 mol % or higher and lower than 50 mol % based on the total amount of the repeating units represented by the formula (A); and
the polycarbonate diol has a number-average molecular weight of from 300 to 20,000.

* * * * *

UNITED STATES PATENT AND TRADEMARK OFFICE
CERTIFICATE OF CORRECTION

PATENT NO. : 8,168,728 B2
APPLICATION NO. : 12/742478
DATED : May 1, 2012
INVENTOR(S) : T. Masubuchi et al.

It is certified that error appears in the above-identified patent and that said Letters Patent is hereby corrected as shown below:

At column 18, line 5 (claim 1, formula (B)) of the printed patent, change

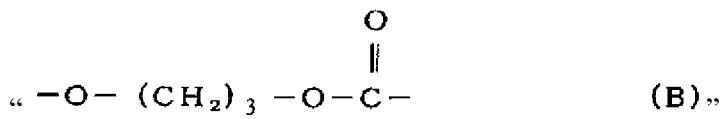

to

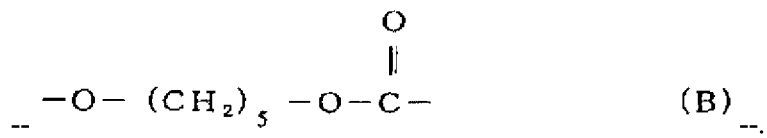

At column 18, line 28 (claim 1, formula (C)) of the printed patent, change

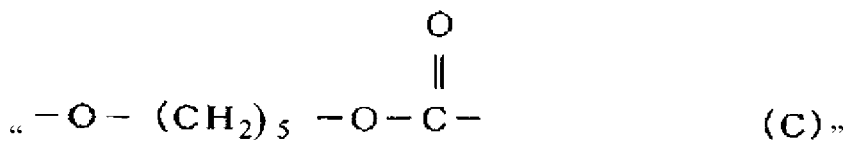

to

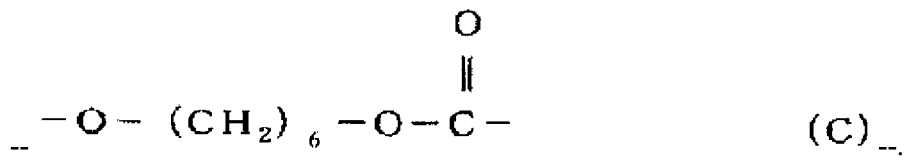

Signed and Sealed this
Thirteenth Day of November, 2012

David J. Kappos
*Director of the United States Patent and Trademark Office*